United States Patent [19]
da Silva

[11] 4,007,422
[45] Feb. 8, 1977

[54] METHOD AND APPARATUS FOR CALLING A GROUND STATION BY AN AIRCRAFT

[75] Inventor: Herman da Silva, Voorburg, Netherlands

[73] Assignee: De Staat der Nederlanden, te Dezen Vertegenwoordigd Door de Directeur-Generaal der Posterijen, Telegrafie en Telefonie, The Hague, Netherlands

[22] Filed: Sept. 8, 1975

[21] Appl. No.: 611,225

Related U.S. Application Data

[63] Continuation-in-part of Ser. No. 443,499, Feb. 19, 1974, abandoned.

[30] Foreign Application Priority Data

Sept. 4, 1973 Netherlands ............ 7312158

[52] U.S. Cl. .................... 325/55; 325/4; 340/356
[51] Int. Cl.$^2$ .................... H04B 1/00
[58] Field of Search ........ 325/3, 4, 13, 26, 38 R, 325/53, 55, 64, 56, 58; 340/311, 312, 167 R, 345, 356; 343/207; 179/15 BA, 15 BS

[56] References Cited

UNITED STATES PATENTS

| | | | |
|---|---|---|---|
| 3,207,851 | 9/1965 | Fukinuki | 325/55 |
| 3,510,777 | 5/1970 | Gordon | 325/55 |
| 3,532,987 | 10/1970 | Turriere | 325/55 |
| 3,596,002 | 7/1971 | Ohnsorgz | 325/55 |
| 3,596,181 | 7/1971 | Dowling | 325/55 |

OTHER PUBLICATIONS

"Coding and its Application in Space Communications", IEEE Spectrum v. 7, No. 6, June 1970, pp. 47–58.

Primary Examiner—Robert L. Griffin
Assistant Examiner—Jin F. Ng
Attorney, Agent, or Firm—Hugh A. Kirk

[57] ABSTRACT

A system for generating a special calling signal to be transmitted from an aircraft to a ground station comprising two parts of repeated groups of 7-unit binary code signals, each of which parts or groups has a constant ratio of 1 and 0 value bits, but has a different ratio for each part or group. The first part or group comprises alternating signals of "idle time" with two successive signals representing the tens and units digits of the call number of one of a hundred different ground stations to be called. This alternate sequence of tens and units signals is repeated a sufficient number of times so as to avoid any error in the reception of a signal from this part and also to place the receiving ground station in phase and synchronism with the calling station in the aircraft. Then the second part or group of the whole calling signal is transmitted which second part comprises three successive separate message signals which are alternately repeated in succession every fifth signal interval. These three message signals can indicate to the ground station, for example, the sector in which the calling station or aircraft is located, the modulation system to be applied for the traffic to follow, and the identification of the office to which the traffic is to be directed.

17 Claims, 10 Drawing Figures

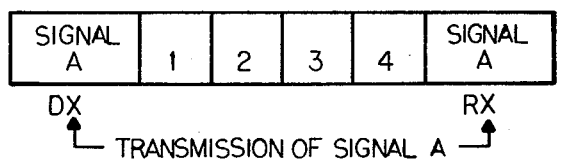
FIG. I
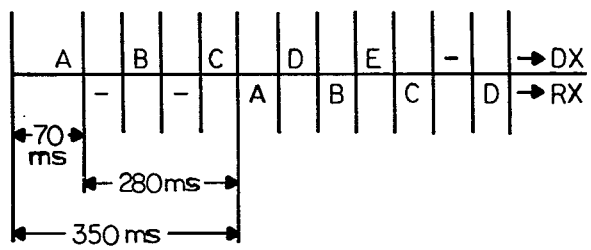
FIG. II
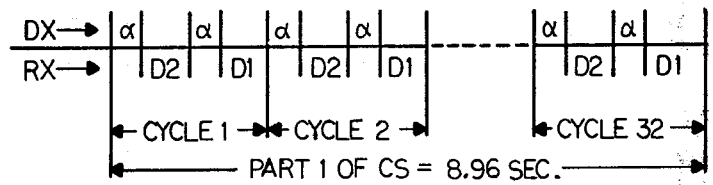
FIG. III
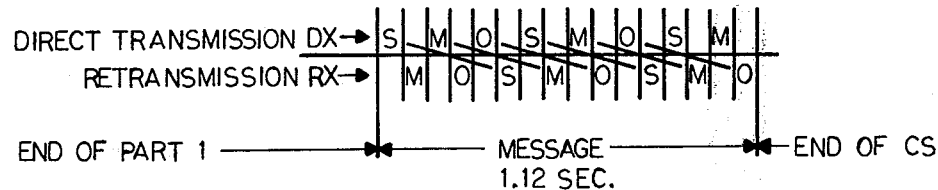
FIG. IV

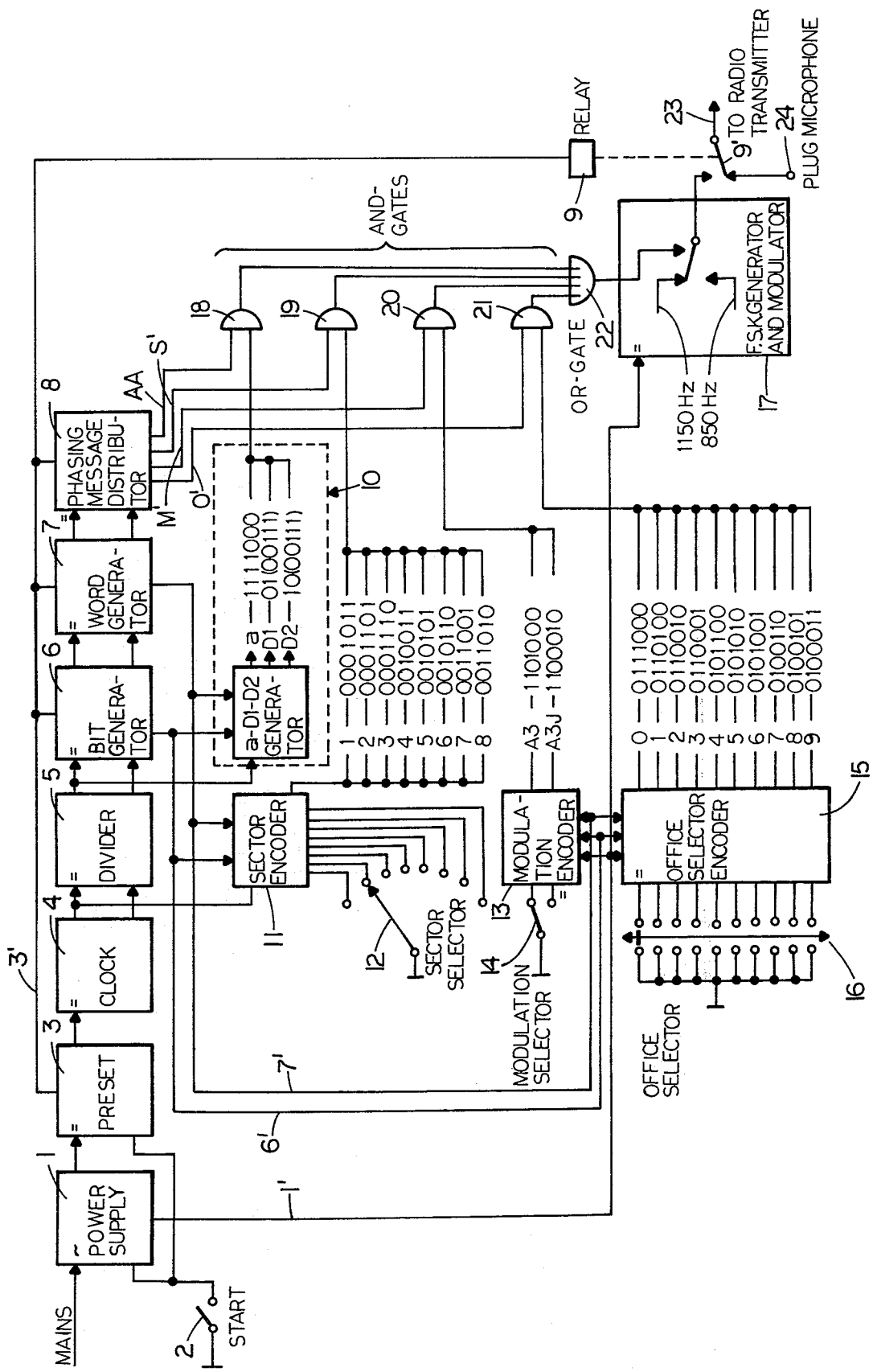
FIG. V

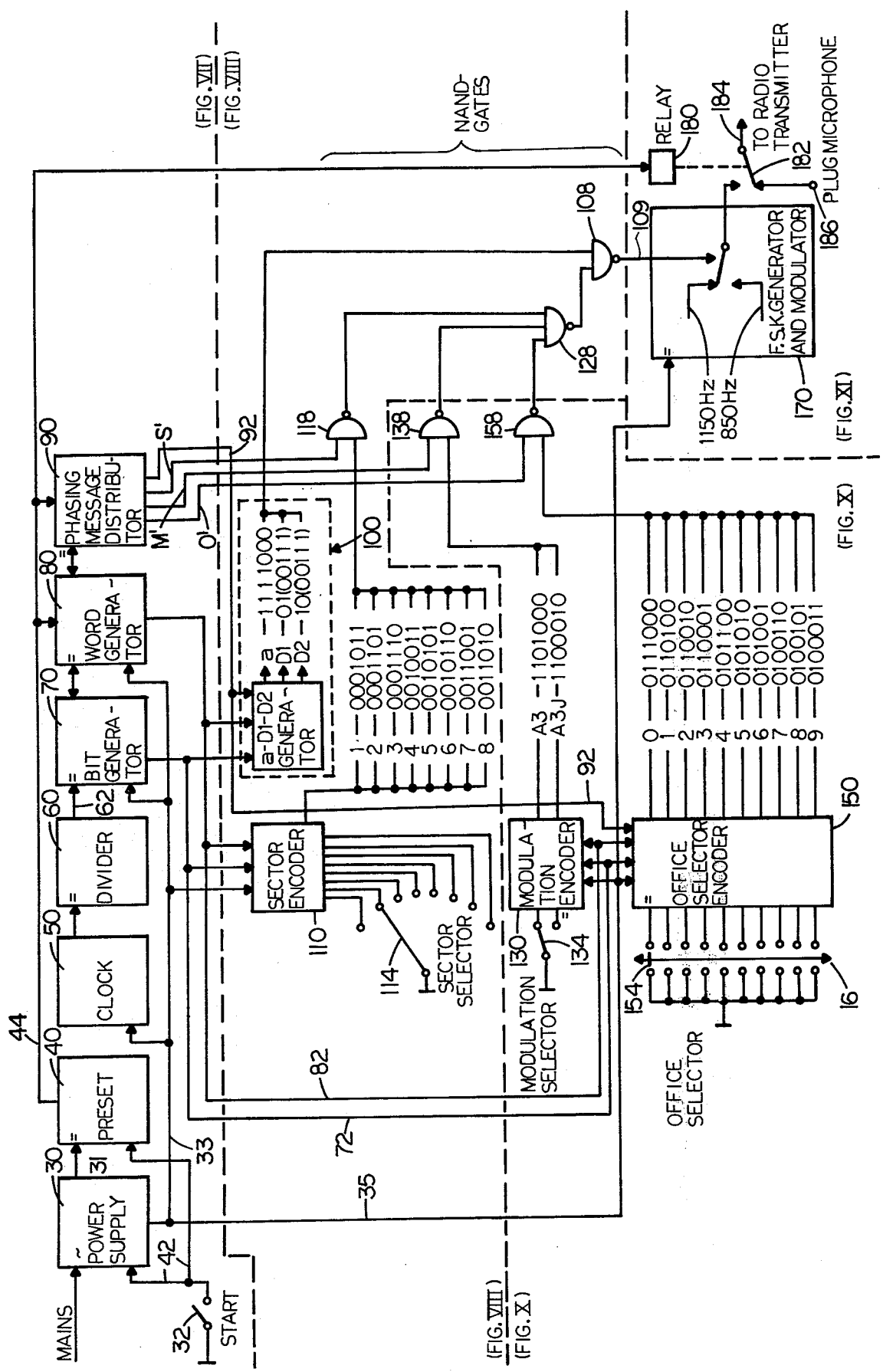
FIG. VI

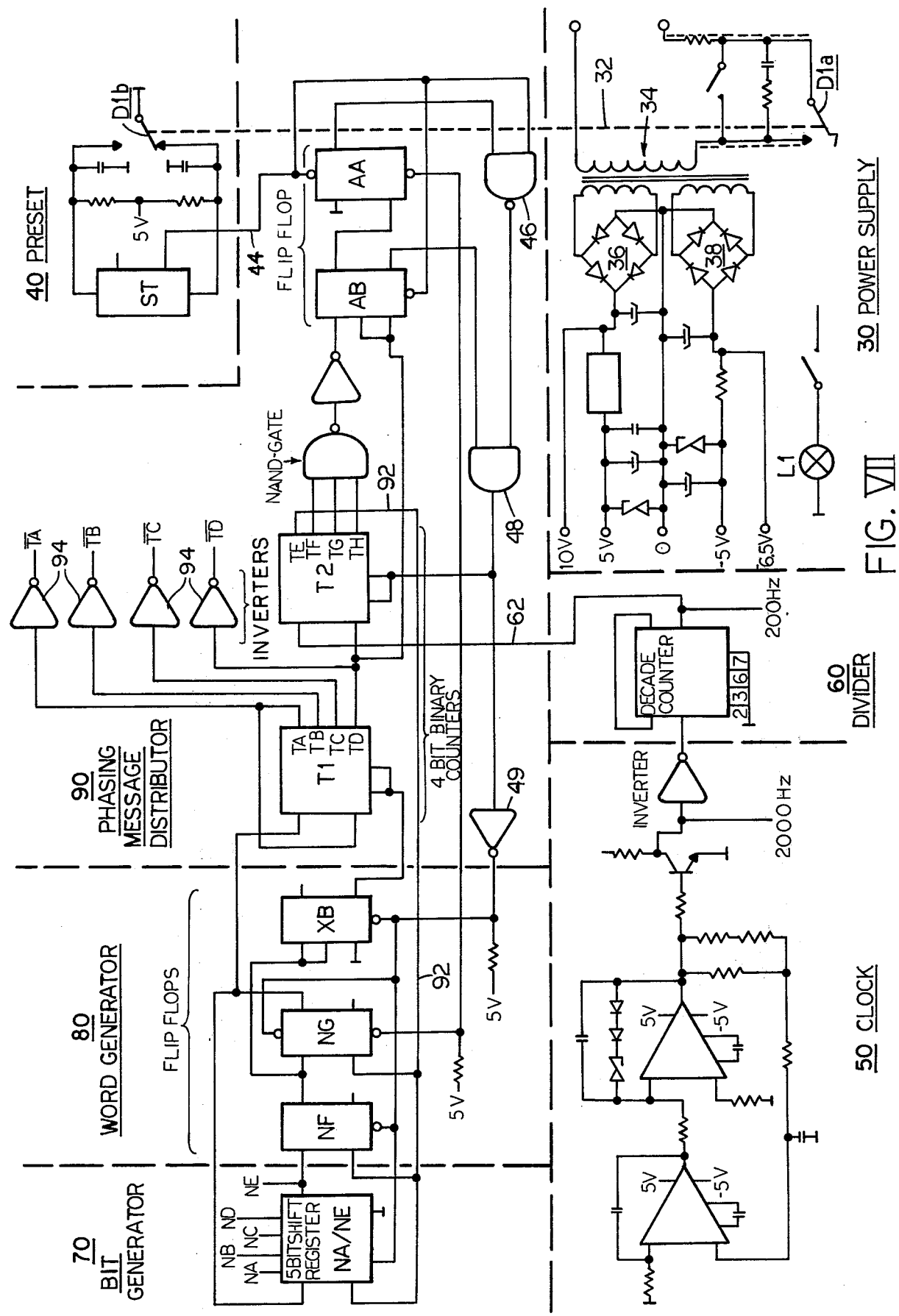
FIG. VII

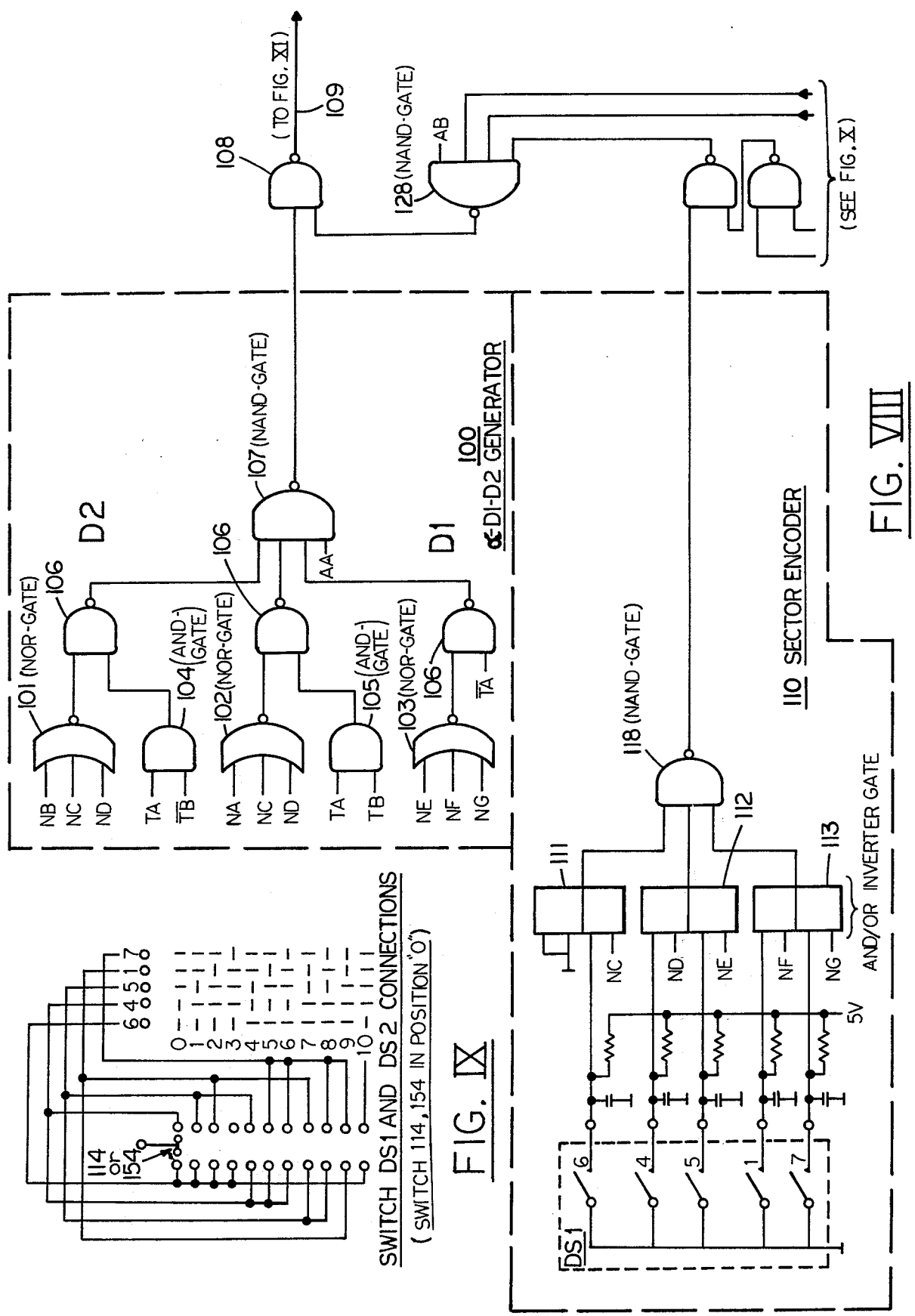

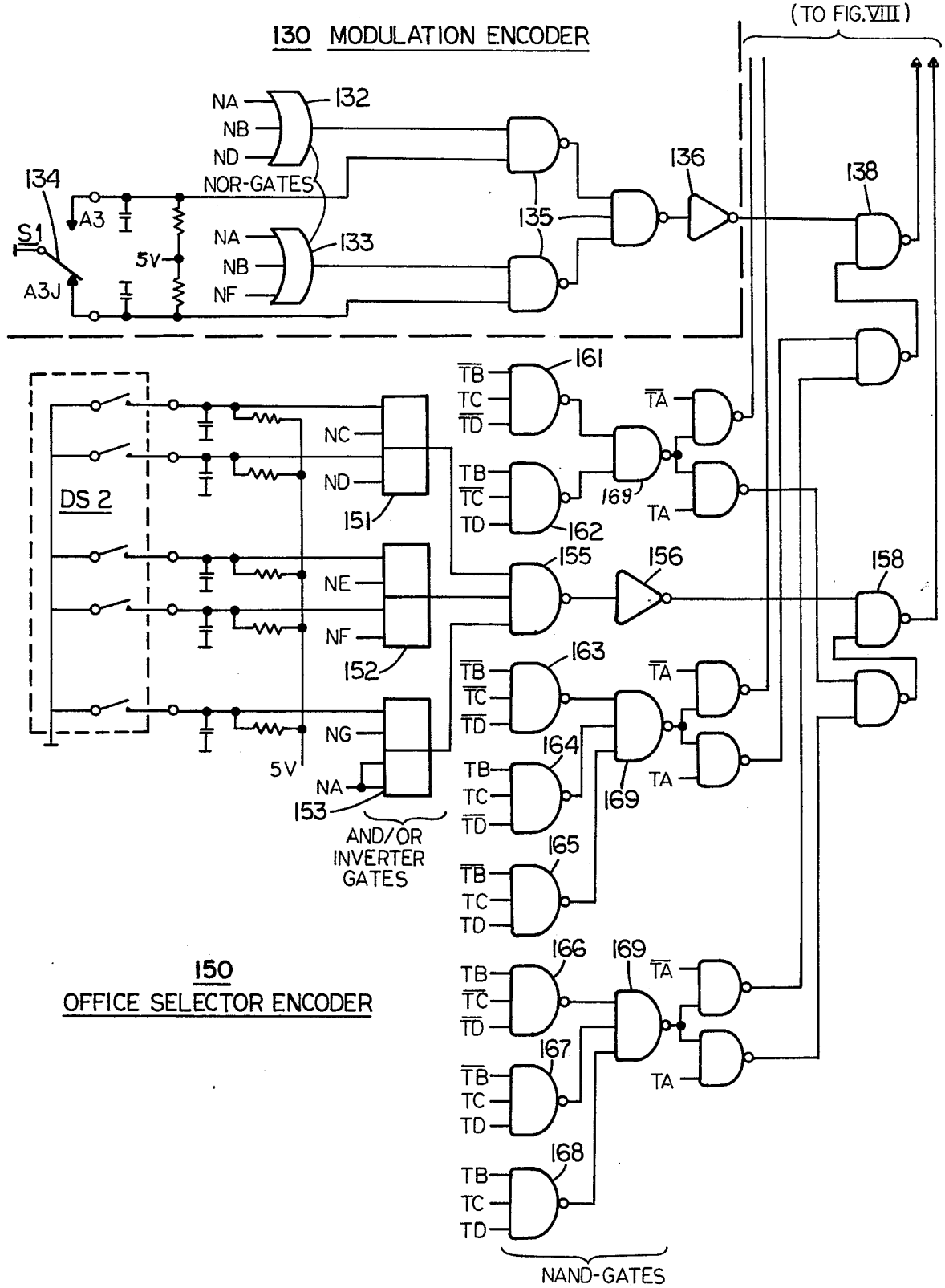
FIG. X

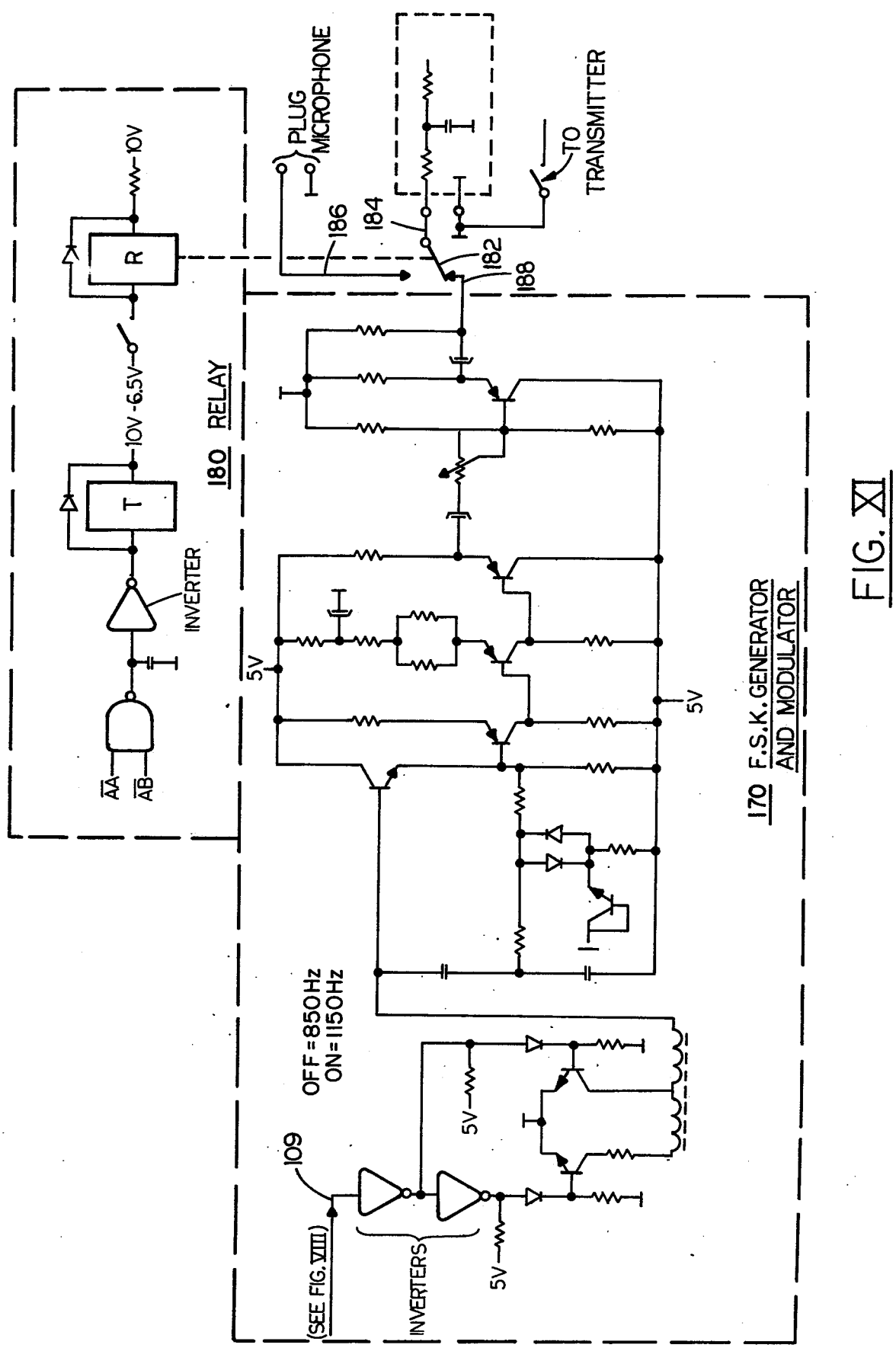

METHOD AND APPARATUS FOR CALLING A GROUND STATION BY AN AIRCRAFT

RELATED APPLICATIONS

This is a continuation-in-part of applicant's copending application Ser. No. 443,499, filed Feb. 19, 1974, now abandoned.

BACKGROUND OF THE INVENTION

The invention relates to a method calling a ground station by an aircraft, by the so-called "Calsel" System. A reverse method, viz. for calling an aircraft by a ground station is called the "Selcal" System and is mentioned in "Aeronautical Telecommunications Annex 10 to the Convention on International Civil Aviation," Volume 1, Equipment and Systems, Aug. 22, 1968, p. 119. A drawback of this "Selcal" System or method for aircraft is that too little power is available.

SUMMARY OF THE INVENTION

Generally speaking, the system and method of this invention is directed to the production and transmission of a two part calling signal from a moving vehicle or aircraft to any one of a plurality of preselected stationary or ground stations, of which there may be a hundred. The first part of this calling signal alternately transmits an idle time signal and the call number of the selected station to which the later message is to be transmitted, and repeats this signal a sufficient number of times, such as 32 times, in order to insure its correct reception and also to synchronize the receiving station with the calling station. Then the second part of the calling signal is transmitted, which repeats alternately for a shorter period of time, preferably twice in each of two different positions or phases, three separate messages, which may comprise: firstly, an indication of the sector in which the vehicle or aircraft is at the time transmission is made; secondly, an indication of the modulation method to be used at the receiver for demodulation of the signals or traffic to follow; and thirdly, an indication to what one out of twenty different offices the received signal is to be directed.

In order to distinguish the different parts of the calling signal, each part contains signals of the same number of binary bits, but the first part is sent in one constant ratio of 1 and 0 bits, while the second part is sent in another constant ratio of said bits, such as, for example ($\frac{7}{3}$) and ($\frac{5}{5}$), respectively.

The first part of the signal which is generated repeats alternately in one of two positions or phases, an idle time or similar signal, and intermediately in the other phase, alternate signals corresponding to the tens and units digits of the calling number of one of the hundred ground stations that can be called. After this first part is repeated, say thirty-two times or cycles, not only is this part of the calling signal correctly received but also the called or receiving station has been synchronized with the transmitting station so that it can distinguish in which channel, position or phase each bit is received.

Now the second or message part of the call signal is transmitted, and this is detected at the receiving station because the balance code ratio of each signal is changed from the signals in the first part or group of signals. This second part or groups of three message signals are repeated once each fifth signal time interval, and this repetition is alternated from one phase or channel to the other, so that each of the three message signals are successively and completely repeated in each phase or channel at least twice, to insure their reception by forward error correction principles.

The circuit for generating and transmitting the special calling signal of this invention comprises: a start switch connecting the circuit to a power supply, a clock, dividers, a phasing message distributor, selector switches for encoders and calling number signal generators, sector encoders, a modulation encoder, and office selector encoders. The outputs of all of these generators and encoders are passed through AND-gates controlled by the phasing message distributor and thence through an OR-gate to a frequency shift keying device or modulator (F.S.K.). This keying device may change the 0 and 1 bits of the binary code to frequencies correspondingly that differ by 300 Hz, or a 150 Hz on each side of a 1000 Hz tone signal. The repetition rate of these signals is at 100 Baud with an accuracy of $10^{-4}$, which rate or frequency may be generated by above mentioned clock and divider which also controls the phasing message distributor, the generators and the encoders.

OBJECTS AND ADVANTAGES

Accordingly it is an object of this invention to produce a new, simple, efficient, effective, economic, rapid, and accurate method and apparatus for calling a ground station from an aircraft.

Another object of this invention is to overcome the drawback so that a whole cycle does not have to be awaited when the receiver fails to receive a calling signal on its first transmission, whereby a gain in speed of 50% is obtained when detecting a call.

Still another object is to produce a two part calling signal in which each part can be distinguished by a receiver without awaiting the whole cycle of repetition of both parts of the calling signal, in case one part is not received.

A further object is to produce a calling signal which not only identifies the station called, but also synchronizes it with the transmitting station by means of forward error correction, which is accomplished by repeating each signal alternately in two different positions which can easily be detected by a receiver of the signal.

BRIEF DESCRIPTION OF THE VIEWS

The above mentioned and other features, objects and advantages, and a manner of obtaining them are described more specifically below by reference to an embodiment of this invention shown in the accompanying drawings, wherein:

FIG. I is a schematic time diagram of the transmission repetition spacing of a signal, such as occurs in the second part of the calling signal;

FIG. II is a schematic time diagram of the transmission of the repetition spacing in each of two separate positions or phases of a plurality of message signals, such as signals, A, B, C, D and E;

FIG. III is a schematic time diagram of the repeated first or calling part of the calling signal of this invention, sent for selection and synchronization of a receiving or ground station;

FIG. IV is a schematic time diagram of the second or message part of the calling signal according to this invention of three successive message signals, S, M and O, for respectively indicating the transmitters location, the type of modulation of the following traffic signals, and the call number of the particular office to which the traffic is to be directed from the receiving station;

FIG. V is a schematic block wiring diagram of a preferred embodiment of a transmitter for producing the two part calling signal of this invention;

FIG. VI is a block diagram similar to that shown in FIG. V but with some different connections of the same blocks to conform better with the more detailed wiring diagrams of these block circuits which are shown in FIGS. VII, VIII, IX, X and XI;

FIG. VII is a wiring diagram of the circuits in the row of blocks along the top of FIG. VI;

FIG. VIII is a wiring diagram of the generator circuit for part I of the calling signal and the sector encoder blocks shown along the center portion of FIG. VI and their connecting gates;

FIG. IX is a wiring diagram of the relationship between the manual selector switches shown in the left in FIG. VI, with respect to the corresponding switches shown at the left sides of the sector encoder in FIG. VIII and the selector encoder in FIG. X;

FIG. X is a wiring diagram of the modulation encoder and office selector encoder shown in the lower left portion of FIG. VI, and their connecting gates; and FIG. XI is a wiring diagram of the frequency shift keying generator and modulator and the relay control circuit shown in the lower right corner of FIG. VI.

THE DETAILED DESCRIPTION OF A PREFERRED EMBODIMENT

I. COMPOSITION OF CALLING SIGNAL CS

Calsel or calling signal transmitted from an aircraft or other vehicle to a designated receiving station on the ground will hereinafter be referred to as the CS-signal, and it is made of parts I and II, each part comprising a plurality or group of seven-unit binary bits as mentioned above.

Since the transmitter of this invention has no means for receiving back an automatic error correction signal from a receiver, the error correction takes place by means of a forward error correction (f. e. c.) method with the help of time diversity. This time diversity is obtained by transmitting each signal twice and in a different position. The first transmission is indicated as DX, and the retransmission is indicated as RX, which retransmission takes place after the transmission of four intermediate signals of 7-bits each. Thus DX and RX transmissions are indicated in FIG. 1 for the signal A, and the transmission in two different positions or phases are schematically illustrated for a plurality of successive signals A, B, C, D and E in the alternate DX and RX phases or positions shown in FIG. II.

The first part I of the calling signal of this invention is for selection and synchronization of the receiving station, and consists of 32 cycles of four signals each. These signals are called α or idle time, D2 for the ten digit of the receiver's calling number, and D1 for the units digit of the receiver's calling number. Each cycle of four of these signals are transmitted in a sequence of α-D2 - α-D1, wherein the signal α always occurs in alternate positions in the DX position or phase as shown in FIG. III, while the calling number digits signals always occur alternately in the RX position or phase. By repeating this first part of the calling signal 32 times, it not only enables the called or receiving station, which has its calling number corresponding to D2, D1, to detect its number, but also it is repeated enough times so that it can detect the position of the idle time signals for proper phasing and synchronism. For example, when the idle time or α signal is represented by the series of seven units $a, b, c, d, e, f,$ and $g$ by the corresponding bits 1111000, the number of the called or receiving station can be determined according to the Table A below:

TABLE A

| Digits | D1<br>a b | D2<br>a b | D1 and D2<br>c d e f g |
|---|---|---|---|
| 0 | 0 1 | 1 0 | 0 0 1 1 1 |
| 1 | 0 1 | 1 0 | 0 1 0 1 1 |
| 2 | 0 1 | 1 0 | 0 1 1 0 1 |
| 3 | 0 1 | 1 0 | 0 1 1 1 0 |
| 4 | 0 1 | 1 0 | 1 0 0 1 1 |
| 5 | 0 1 | 1 0 | 1 0 1 0 1 |
| 6 | 0 1 | 1 0 | 1 0 1 1 0 |
| 7 | 0 1 | 1 0 | 1 1 0 0 1 |
| 8 | 0 1 | 1 0 | 1 1 0 1 0 |
| 9 | 0 1 | 1 0 | 1 1 1 0 0 |

Thus the above table shows how the seven unit signals for the tens and units digits D2 and D1 of the calling part I are composed. These two digits, namely 00 through 99, of which there are 100 different combinations for a corresponding number of receiving or ground stations, each comprises a signal of seven units $a, b, c, d, e, f, g$ in which the first two units of each signal indicate if it is a unit digit D1 or a ten digit D2, i.e. having value bits 01 for the units $a$ and $b$, or value bits 10, respectively. Then the units $c, d, e, f, g$ are the same for the corresponding figures or "Digits" of that digit of the called number in the Above Table A.

The second part II of the calling signal CS, herein comprises three messages, each represented by a seven unit binary signal having a different constant ratio of 0 and 1 bits, viz: in the ($\frac{5}{7}$) constant variations; and the three messages are of:

1. The sector location (S) of the calling or transmitter station or aircraft of which one of eight different sectors can be selected;
2. The modulation system (M) of which one of two modulation systems A3 and A3J is selected for the transmission of the traffic that will follow, and
3. The office calling number or signal (O) of which one of 20 different offices is selected to be connected to the receiving station to which the message is to be delivered.

Each of these three message signals S, M, and O is transmitted in succession at least twice in each position or phase DX and RX as shown in FIG. IV in order to insure two complete repetitions in each of the two positions or phases DX and RX, taking into account the repetition required for time diversity.

The eight different seven unit signals S for the eight different sectors are made up according to the following Table B in which the first two bits for units $a, b$ of each signal have a 00 value and the units $c, d, e, f,$ and $g$ identify the sectors 1 through 8, the same as for the units of the calling number digits 1 through 8 in Table A above.

TABLE B

| sector | signal for S | |
|---|---|---|
| | a b | c d e f g |
| 1 | 0 0 | 0 1 0 1 1 |
| 2 | 0 0 | 0 1 1 0 1 |
| 3 | 0 0 | 0 1 1 1 0 |
| 4 | 0 0 | 1 0 0 1 1 |

TABLE B-continued

| sector | signal for S a b | c d e f g |
|---|---|---|
| 5 | 0 0 | 1 0 1 0 1 |
| 6 | 0 0 | 1 0 1 1 0 |
| 7 | 0 0 | 1 1 0 0 1 |
| 8 | 0 0 | 1 1 0 1 0 |

The message signal M for identifying the modulation system A3 or A3J has the first two units $a, b$ of each of its signals valued 11, and other five units $c, d, e, f, g$ have two different identifying series of bits as shown in the following Table C:

TABLE C

| modulation method | signal for M a b | c d e f g |
|---|---|---|
| A3 | 1 1 | 0 1 0 0 0 |
| A3J | 1 1 | 0 0 0 1 0 |

The signal O for the identification of the office of destination has a possibility of selecting one out of twenty different offices for the numbers 0 through 19. Thus the relevant signals may be classified in a similar way as the digits signals D1 and D2 above, however, with the inverse values for the units $c, d, e, f, g$ as disclosed in Table D below, with the first two units $a, b$ for the first ten numbers shown on the left hand side of Table D having the value 01, and for the second ten numbers being the value 10 as shown on the right hand side of Table D.

TABLE D office identification numbers

| | a b | Signal for O c d e f g | a b | |
|---|---|---|---|---|
| 0 | 0 1 | 1 1 0 0 0 | 1 0 | 10 |
| 1 | 0 1 | 1 0 1 0 0 | 1 0 | 11 |
| 2 | 0 1 | 1 0 0 1 0 | 1 0 | 12 |
| 3 | 0 1 | 1 0 0 0 1 | 1 0 | 13 |
| 4 | 0 1 | 0 1 1 0 0 | 1 0 | 14 |
| 5 | 0 1 | 0 1 0 1 0 | 1 0 | 15 |
| 6 | 0 1 | 0 1 0 0 1 | 1 0 | 16 |
| 7 | 0 1 | 0 0 1 1 0 | 1 0 | 17 |
| 8 | 0 1 | 0 0 1 0 1 | 1 0 | 18 |
| 9 | 0 1 | 0 0 0 1 1 | 1 0 | 19 |

The duration of a complete Calsel Signal CS according to FIGS. III and IV is 8.96 seconds for the first or calling part I, and 1.12 seconds for the second or message part II, making a total of 10.08 seconds for the transmission of the whole CS signal.

II. GENERATING CIRCUIT FOR CS SIGNALS

Referring now to FIG. V there is schematically shown a simple generating circuit for the calling signal CS of this invention. In the upper left hand corner of FIG. V is a power supply 1 which is turned on by a manual or other switch 2 which simultaneously starts the preset circuit 3. This power supply supplies power to all the circuits in FIG. V including the encoders 13 and 15 and the generator and modulator 17 via conductor 1'.

This preset circuit 3 is connected via conductor 3' to energize a bit generator 6, a word generator 7, a phasing message distributor 8, and operates relay 9 to move the switch 9' from its microphone plug 24 to its other contact for connecting the particular generator calling circuit of FIG. V to the output conductor 23 to the ratio transmitter on the vehicle or aircraft. Also connected to the preset circuit 3 is a clock 4 which generates pulses at the frequency of 2000 Hz. These pulses are then connected to the divider circuit 5 to divide them down to a frequency of 100 Hz for controlling the bit generator 6. This bit generator 6 in turns controls the word generator 7 which in turn controls the phasing message distributor 8.

The first part I of the calling signal CS is generated in the α- D1–D2 call station number generator 10 in which the signals shown in FIG. III are produced, each having seven-bits as shown in the dotted block 10. The bits of these signals are passed through the AND-gate 18, under the control of the phase message distributor 8 via conductor AA, to operate the frequency shift-keying generator and modulator 17 for 32 cycles of α-D2 – αD1 as mentioned above and shown in FIG. III. For example, when the ground station is numbered 63, the transmitted code is 1010110 for D2 and the ten digit 6, and 0101110 for D1 and the unit digit 3. Only the station numbered 63 then can respond to this calling signal.

The second part II of the calling CS generated in three encoders 11, 13 and 15 is controlled by selector switches 12, 14, and 16, respectively.

By means of the sector selector 12, the encoder 11 can be adjusted for the desired sector in which the aircraft is located. This encoder 11 is also controlled by the bit generator 6 and word generator 7 via conductors 6' and 7', respectively, to correspondingly encode the selected one of the eight different seven-unit sector signals shown at the output of the encoder and connected to the AND-gate 19 for passage under control of the phasing message distributor 8 via conductors S' to the F.K.S. generator modulator 17 via the OR-gate 22.

Similarily, the type modulation indicating encoder 13 generates two seven-unit signals corresponding to the two different modulation modes A3 and A3J, one of which is selected by the modulation selector 14 to be passed under the control of the phasing message distributor 8 via conductor M' through the AND-gate 20 and the OR-gate 22 to the F.S.K. generator modulator 17. This modulator and encoder 13 is also controlled by the bit generator 6 and word generator 7 via conductors 6' and 7' as is the sector encoder 11 and the following office selector encoder 15.

Lastly, the selector switch 16 selects the seven-unit calling number signal 0 of one of twenty different offices for generation in the office selector encoder 15, from which one of the signals shown in Table D is generated and passed under the control of the distributor 8 via conductor O' through AND-gate 21 and OR-gate 22 to the modulator 17. This modulator 17 thus repeats and transmits the signals of the second part II in the time sequence according to the diagram shown in FIG. IV.

Referring now to FIGS. VI through XI there are disclosed block and wiring diagrams of one specific embodiment of the signal generator of this invention, in which FIG. VI contains all the blocks shown in FIG. V, but showing them connected to correspond better to the more detailed detached wiring diagrams of these blocks shown in FIGS. VII through XI. It is to be understood that terminals containing identical reference characters are to be connected, for example: the terminal "+ 5 V" (or plus 5 volt) in the power supply circuit 30 in FIG. VII is connected to all the "+ 5 V" terminals in FIGS. VII, VIII, X, and XI; and the terminals NA through NG on the bit and word generators 70 and 80 in FIG. VII are connected to the input terminals of the same reference characters of the gates and triggers of the generator and encoders in 100, 110, 130 and 150 in FIGS. VIII and X; etc.

Referring first to FIGS. VI and VII, there is shown in the upper left corner of FIG. VI a power supply circuit 30 which is initiated by a manual switch 32, which at the right in FIG. VII contains two separate contacts D1a and D1b. The former contact D1a of which energizes a transformer 34 connected to two rectifier bridge circuits 36 and 38 for producing two different positive and negative direct current voltages between a ground terminal, shown and identified by their voltage values at the left of the dashed line block 30 in FIG. VII. These different potentials are connected to the other blocks in the circuit diagram in FIG. VI as indicated by conductors 31, 33 and 35. Conductor 31 is connected to the pre-set circuit 40. Conductor 33 is connected to the clock circuit 50, the bit generator 70, and the word generator 80. Conductor 35 is connected to the modulation encoder 130, office selector encoder 150, and F.S.K. generator and modulator 170. The different voltages produced by the power supply 30 are shown in each of these other circuits in FIGS. VII, VIII, X and XI which values correspond to those terminals voltages indicated at the left side of dash lined block 30 in FIG. VII.

Simultaneously, with the turning on of the manual switch 32 for the power supply 30, the switch D1b in the pre-set circuit 40 is also operated as indicated by connections 42 in FIG. VI. This pre-set circuit 40 in turn is connected via conductor 44 in FIG. VI to central trigger AA in the phasing message distributor circuit 90 and also through successive gates 46 and 48 and a driver 49 to control the word generator 80 which in turn controls the bit generator 70.

The turning on of the power supply by the manual switch 32 also, via the conductor 33 in FIG. VI, energizes the clock circuit 50 shown in detail in lower left corner of FIG. VII. This clock circuit is an oscillator circuit comprising two interconnected amplifiers and an inverter to produce 2000 pulses per second (2000 Hz). This clock 50 triggers a decade counter or divider 60 that divides the 2000 pulses per second down to 200 pulses per second (200 Hz) for direct connection via conductor 62 to one of the two four-bit binary counters, namely counter T2, in the phasing message distributor circuit 90. The output of this counter T2 is connected via conductor 92 for controlling one of the three flip-flops NG in the word generaor 80 and for controlling the five-bit shift register NA, NB, NC, ND, NE, comprising five successive flip-flops or multi vibrator circuits in the bit generator circuit 70. The corresponding outputs of each one of these flip-flops labeled with the corresponding reference characters are then connected to the trigger circuits in the generator and encoders 100, 110, 130 and 150 as shown more specifically in FIGS. VIII and X. Similarly the outputs of the four-bits binary counters T1 and T2 shown in the phasing message distributor 90 are either inverted in inverters 94 or directly connected also to the same generator and encoders. The inverted outputs have their reference characters written with a bar thereover.

Referring now to the station calling signal or α - D1 - D2 generator circuit 100 shown in FIG. VIII, this circuit is comprised of three NOR-gates 101, 102 and 103 and two AND-gates 104 and 105, the outputs of which are connected to three more gates 106 and thence to another gate 107. The connections of the triggers NA through NG and the counter T1 of the generator circuits 70, 80 and 90 to the gates 101, 102 and 103 are shown via conductors 72, 82, and 92 in FIG. VI, but are not shown in the detached wiring diagrams in this or the other Figures since the connections are indicated by the similar reference characters to the input and output terminals of the different circuits as described above. The output of this circuit 100 or NAND gate 107 is finally connected to another NAND-gate 108 before being connected via conductor 109 to the frequency shift key generator and modulator circuit 170 (see also FIGS. VI and XI). This circuit 100 generates the signals α, D1, and D2 as described above and shown in the dotted rectangle 100 in FIGS. V and VI.

Referring now to FIGS. VIII and IX there is disclosed the sector encoder 110 which comprises three trigger circuits 111, 112 and 113 which are connected by five switches DS1 which are opened and closed according to the wiring diagram shown in FIG. IX, which corresponds to the position of the manual selector switch 114 shown in another form in FIG. VI below the block 110, or in the same form for switch 154 that moves vertically between the contacts at the left of the selector encoder 150 in FIG. VI. The output of the three triggers 111, 112 and 113 is herein shown through a NAND-gate 118 and thence through a common NAND-gate 128 (see also FIG. VI) for the outputs of the other selector encoders 130 and 150.

Referring now to FIG. X there is shown at the top the modulation encoder circuit 130 controlled by a manual selector switch 134 which alternately connects two NOR-gates 132 and 133 via gates 135 through an inverter 136 and NAND-gate 138 to the common NAND-gate 128 connected to the frequency shift key generator and modulator circuit 170.

Also in FIG. X is provided the office selector and encoder 150 which comprises three triggers 151, 152 and 153, similar to the circuit of the selector encoder 110, which triggers 151, 152 and 153 in turn are connected through gate 155, inverter 156 to NAND-gate 158 and then to the common NAND-gate 128. Each of these three triggers 151, 152 and 153 are correspondingly controlled by switches DS2 in accordance with the manual selector switch 154 as shown in FIG. IX and FIG. VI as described above. Included as part of this particular office selector encoder circuit 150 are a plurality of NAND-gates 161 through 169 controlled directly by the outputs of the four-bit binary counters T1 or their inverters 94 in the phasing message distributor 90 to aid in producing the office selector signals in accordance with the previous descriptions thereof with Table D above.

The combined output from the five different NAND-gates 118, 138, 158, 108, and 128, as shown in FIG. VI or FIGS. VIII and X, is connected to the frequency shift key generator and modulator 170, the wiring diagram of which is shown in FIG. XI. This circuit 170 produces the two different frequencies, herein 850 Hz and 1150 Hz, for transmission via its output switch 182, controlled by relay circuit 180 for switching automatically the connection 184 to the radio transmitter from the plug microphone terminal 186 to the automatic calling signal terminal 188 and the back again after completion of the transmission of the calling signal according to the circuit of this invention. This relay circuit 180, shown at the top of FIG. XI is controlled by inverted pulses from the triggers AA and AB in the phasing message distributor circuit 90 shown in FIG. VII.

Although each of the elements of the wiring diagram shown in FIGS. VII through XI are not specificaly described, it is believed the structure and connections shown in these drawings for logic circuits of gates, inverters, amplifiers, triggers, etc. are sufficiently well known to anyone skilled in the electronics art so that a system according to this invention can be reproduced.

Furthemore, although the specific embodiment described above involves a particular number of repetitions and bits per signal, it should be understood that other bits per signal, sequences, numbers of calling stations, and the like, may be employed without departing from the scope of this invention. Also, while there is described above the principles of this invention in connection with a specific generating apparatus, it is to be clearly understood that this description is made only by way of example and not as a limitation to the scope of this invention.

I claim:
1. A method for calling a receiving station by a mobile transmitting station comprising:
   A. generating multi-bit binary first calling code signals ($\alpha$, D1, D2) indicating idle time signals and call number signals corresponding to numbered receiving stations,
   B. alternately transmitting for a predetermined number of cycles said idle time signals in one phase between alternate ones of said call number signals, said call number signals being transmitted in another phase,
   C. then generating multi-bit binary second message code signals (S, M, O) of the same number of bits per signal as said first code signals indicating the location of the mobile transmitting station, the mode of modulation of signals to be transmitted later and the call number of the receiving station, and
   D. transmitting each of the second code signals twice in succession but in alternate phases and at least twice in each phase.
2. A method according to claim 1 wherein said transmitting station is on an aircraft.
3. A method according to claim 1 wherein said receiving station is on a ground station.
4. A method according to claim 1 wherein said multi-bit binary code signal contains seven bits.
5. A method according to claim 1 wherein said first signals have a different constant ratio of bits than that of said second signals.
6. A method according to claim 5 wherein said constant ratio bits is 3 to 4 for one of said signals and 4 to 3 for the other of said first and second signals.
7. A method for callling a receiving station by a mobile transmitting station comprising:
   A. generating multi-bit binary first calling code signals ($\alpha$, D1, D2), having a first constant ratio of bits, comprising: idle time signals, and ten and unit digit signals corresponding to one of a plurality of different two digit numbered receiving stations,
   B. alternately transmitting for a predetermined number of cycles said idle time signals in one phase between alternate ones of said ten and digit signals, said ten and digit signals being transmitted in another phase,
   C. then generating multi-bit binary second message code signals (S, M, O), having a second constant ratio of the same number of bits per signal as said first code signals indicating the location of the mobile transmitting station, the mode of modulation of signals to be transmitted later and the call number of the receiving station, and
   D. transmitting each of said second code signals twice in succession but in alternate phases and at least twice in each phase.
8. A generator for producing a two part calling signal for a mobile transmitter comprising:
   A. means for generating the first part of said calling signal composed of a plurality of multi-bit binary code signals including:
      1. means for generating idle time signals,
      2. means for generating call number signals corresponding to the call number of one of a plurality of receiving stations, and
      3. means connected to said generating means for the first part of said calling signal for alternately transmitting said idle time signals in one phase and said call number signals in another phase a predetermined number of times to produce said first part of said calling signal,
   B. means for generating the second part of said calling signal composed of a plurality of multi-bit binary code signals having the same number of bits per signal as said signals in the first part, including:
      1. means for generating a plurality of separate preselected message signals,
      2. separate means for selecting each message signal, and
      3. means connected to said generating means for the second part of said calling signal for transmitting each of said message signals twice in succession but in alternate phases and at least twice in each phase.
9. A generator according to claim 8 wherein the signals of one part have a different constant ratio of bits than the signals of the other part of said two parts calling signal.
10. A generator for producing a two part calling signal for a mobile transmitter, comprising:
   A. means for generating the first part of said calling signal composed of a plurality of multi-bit binary code signals including:
      1. means for generating idle time signals,
      2. means for generating call number signals corresponding to the call number of one of a plurality of receiving stations,
      3. means connected to said generating means for the first part of said calling signal for alternately transmitting said idle time signals in one phase and said call number signals in another phase a predetermined number of times to produce said first part of said calling signal,
   B. means for generating the second part of said calling signal composed of a plurality of multi-bit binary code signals having the same number of bits per signal as said signals in said first part including:
      1. for generating a group of separate preselected message signals indicating successively, a. the location of the mobile transmitter,
b. the mode of modulation of signals to be transmitted later, and
c. the call number of the office to which the later signals are to be directed,
2. separate means for selecting one of a plurality of indications for each of said message signals, and
3. means connected to said generating means for the second part of said calling signal for transmitting each of said message signals twice in succession but in alternate phases so that each group of message signals are repeated at least once in succession in each phase and the first message signal of each group is transmitted each fifth signal interval in an alternate phase.

11. A generator for producing a two part calling signal for a mobile transmitter, comprising:
A. means for generating call number signals for one of a plurality of receiving stations,
B. means for generating idle time signals,
C. means connected to said generating means for said call number signals and said idle time signals for alternately transmitting said idle time signals in one phase and said call number signals in another phase a predetermined number of times to produce the first part of said calling signal,
D. means for selecting one of a plurality of sector location indicating signals of said mobile transmitter,
E. means for generating code signals for the selected sector indication,
F. means for selecting a modulation mode of traffic signals to be transmitted to the selected receiving station,
G. means for generating code signals corresponding to the selected modulation mode,
H. means for selecting a call number corresponding to an office to which the later traffic signals at the receiving station are to be directed,
I. means for generating code signals corresponding to the call number of the selected office, and
J. means connected to said generating means for said selected sector, said indicating modulating mode, and said office call number code signals for successively transmitting said sector, modulation mode, and office call number code signals successively and alternately of each other twice in each phase for producing the second part of said calling signal.

12. An apparatus according to claim 11 wherein said means for alternately transmitting the first part of said signal comprises means for repeating it thirty-two times.

13. An apparatus according to claim 11 including switch means for connecting said calling signal generator to a radio transmitter.

14. An apparatus according to claim 11 wherein said means for transmitting all of said generated signals comprises a phase message distributor and a plurality of gates for each separate signal.

15. An apparatus according to claim 14 wherein both said transmitting means includes a frequency shift-keying generator and modulator for successively transmitting each bit of each signal and a phase message distributor for controlling said frequency shift-keying generator and modulator.

16. An apparatus according to claim 14 wherein each of said signals comprises seven binary bits.

17. An apparatus according to claim 16 including means for transmitting the seven binary bits of the station call number and idle time signals according to one constant ratio, and the seven binary bits of the selected sector, modulation mode, and office call number signals according to another constant ratio.

* * * * *

UNITED STATES PATENT OFFICE
CERTIFICATE OF CORRECTION

Patent No. 4,007,422  Dated February 8, 1977

Inventor(s) Herman da Silva

It is certified that error appears in the above-identified patent and that said Letters Patent are hereby corrected as shown below:

Column 1, line 11, after "method" insert -- for --.

Column 9, line 4, "the" should read -- then --.

Column 10, line 67, before "for" insert -- means --.

Signed and Sealed this

Second Day of May 1978

[SEAL]

Attest:

RUTH C. MASON  
Attesting Officer

LUTRELLE F. PARKER  
Acting Commissioner of Patents and Trademarks